Figure 1:
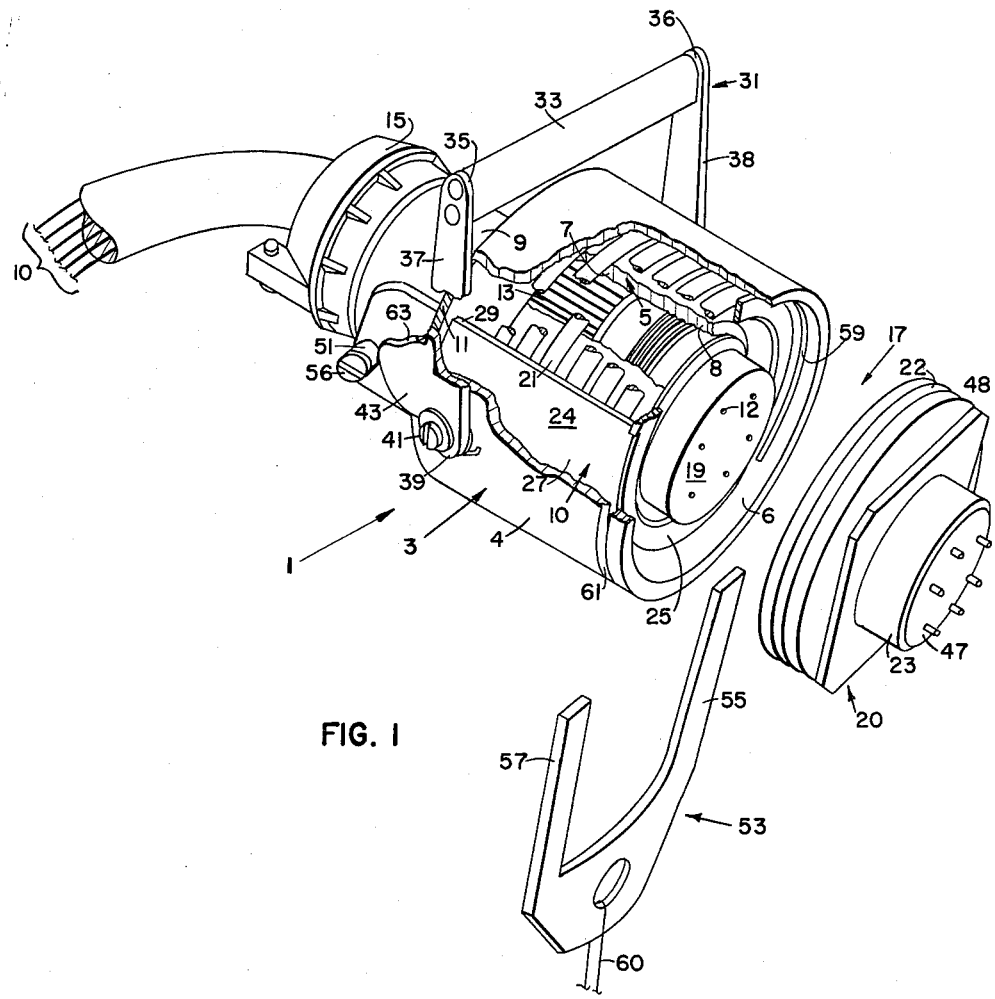

July 6, 1965 S. F. BOYLE ETAL 3,193,790
UMBILICAL CONNECTOR
Filed Feb. 25, 1963

Stanley F. Boyle
Phillip E. Theobald,
INVENTORS.

BY
Leonard Flank

United States Patent Office 3,193,790
Patented July 6, 1965

3,193,790
UMBILICAL CONNECTOR
Stanley F. Boyle, Huntsville, Ala., and Phillip E. Theobald, Rochester, Mich., assignors to the United States of America as represented by the Secretary of the Army
Filed Feb. 25, 1963, Ser. No. 260,930
5 Claims. (Cl. 339—45)

This invention relates to an umbilical connector as may be used in a missile firing system and more particularly to a separable connector for a system wherein many missiles are fired from the same launching site.

In many missile systems electrical contact is maintained between the missile and ground until actual launching occurs for example, when a missile is electrically ignited, or when the missile's attitude must be monitored during the countdown stages and liftoff. In such applications, an umbilical connector is commonly used to maintain positive connection between the electrical circuits of a data monitoring control center and the electrical control circuits in the interior of the missile, or the like vehicle. A connectior of this type must have quick-disconnect capabilities upon launch of the vehicle. Since successful firings are directly dependent on the reliability of such connectors, there is a continuing need for a more reliable, quick-disconnect type connector assembly. Known connectors of this type have been relatively complex in structure and have generally proven unsatisfactory. For example, known connectors have not provided the instantaneous and positive disconnect function desired. In addition, the use of known connectors has been expensive and uneconomical since they have not been reusable.

Therefore, a type of connection is needed in which many circuits can pass conveniently between the missile and ground control, and in which the circuits can be easily and safely broken during liftoff.

It is, therefore, an object of this invention to provide a self-contained, umbilical type connector for use in missile firing systems with the feature wherein substantially the entire unit is reusable, i.e., only a minimum of connector parts remain with the missile and are not reusable.

Another object is to provide an umbilical connector that needs no special arming tools or servicing to ready the connector for reuse.

Still another object is to provide a connector that does not utilize an explosive charge to effect a break of the circuit between the missile and ground.

A further object of the present invention is to provide an umbilical connector unit with a self-contained cocking mechanism for effecting the required instantaneous disconnect function with the feature wherein only a light manual force is required to prepare the same for use, and wherein the unit may be cocked prior to mating of the separable connector parts.

An important object of this invention is to provide a reliable, self-contained locking means for simultaneously restraining the cocking mechanism and positively holding the connector parts in mating engagement until disconnect.

Yet another object is to provide a connector that is simple to operate, reliable in operation, inexpensive to fabricate and durable in reuse over many missile firings.

Figure 2:
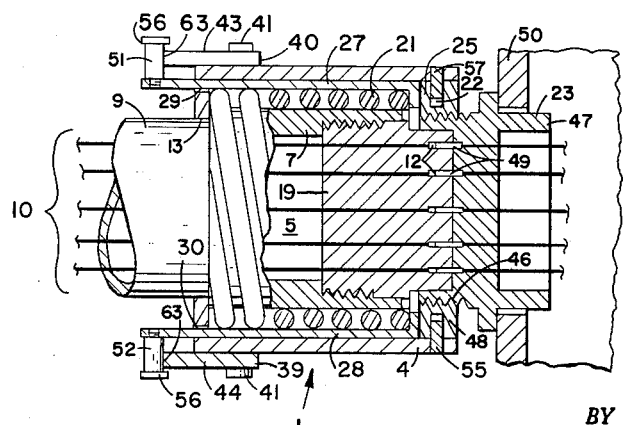

The foregoing objects will become more apparent upon consideration of the following detailed description and the accompanying drawings, in which:

FIGURE 1 is a perspective view, partly broken away, of the umbilical connector at the instant of separation; and FIGURE 2 is a cross-sectional view of the connector in a cocked position.

Referring to the drawings, FIGURE 1 shows the umbilical connector 1 of this invention. The connector includes a cylindrical housing 3 having a sidewall 4, a tubular conduit section 5, a male-female electrical connector 17, a spring biased hammer 24, a cocking mechanism 31, and a lock 53.

The tubular conduit section 5 includes an internally threaded upper portion 7 disposed within the housing and a lower portion 9 extending through an opening 13 in the base 11 of the housing. The conduit section is secured to base 11 by any suitable means. The lower portion 9 is adapted at its end 15 (shown in FIGURE 1) for connection to a data monitoring system (not shown). Electrical circuits 10 from the data monitoring system pass through the conduit 5 to the female member 19 of the male-female connector 17. The female member has a plurality of electrical sockets 12 and is threaded to the end 8 of the upper portion 7 of the conduit.

An expansion spring 21 is disposed in the housing and about the upper portion 7 of the conduit. The spring biases the hammer 24 having an annular hammer head 25 away from the base of the housing. As depicted in FIGURE 2, the spring is disposed with one end in abutment with the housing base and with the opposite end in abutment with the inner face of the hammer head. Diametrically opposed tongues 27 and 28 (shown in FIGURE 2) are rigidly fastened to the hammer head and extend normal thereto toward the base 11. The tongues extend slidably through guide slots 29 and 30 (shown in FIGURE 2) provided in the base 11.

The cocking mechanism 31 prepares the connector for use and includes a handle 33 having lever arms 37 and 38. Each lever arm has one end fixed to the respective ends 35 and 36 of the handle. Each lever arm has its other end 39 and 40 respectively pivotally fastened to the housing by means of bolts 41. Cam surfaces 43 and 44 integrally formed wth the lever arms adjacent ends 39 and 40 thereof, are positioned to be contacted by cam rollers 51 and 52 respectively. Each roller is rotatably carried on a bolt 56 which in turn is fixed to the respective tongues 27 and 28 adjacent the ends thereof remote from the hammer head 25.

Male member 20 of female-male connector 17, is provided with a plurality of electrical terminals 49 projecting outwardly therefrom (FIGURE 2). Releasable engagement of the male member with female member 19 is provided by the insertion of terminals 49 into the sockets 12 of the female member.

The male member is constructed of two parts, namely a cylindrically shaped element 23 and a disk-like element 48 threadably mated to end 46 of the element 23. The end 47, remote from end 46, of cylindrically shaped element 23 extends through missile wall 50 to convey electrical circuit lines 10 to the interior of the missile. Disk-like element 48 has a groove 22 about the periphery thereof to operatively engage the lock 53.

The generally U-shaped, forked lock 53 of FIGURE 1 has a pair of spaced parallel tines 55 and 57 which are slidably inserted into diametrically opposed slots 59 and 61 respectively, provided through the housing wall 4 adjacent the open end 6 of the housing. The tines extend slidably through the slots 59 and 61 to engage groove 22 about the periphery of the male member 20 to restrain the male member against the spring biased hammer head as seen in FIGURE 2.

In operation, FIGURE 2 shows the umbilical connector mated, thus conveying data to and from the missile. FIGURE 2 also shows the umbilical connector cocked and in the locked position. The connector 1 is cocked by rotating the handle 33 causing the cam rollers 51 and 52 to follow the cam movement. This movement is in a direction so as to move the hammer head toward the housing base and against the resilient effort of spring 21. As the handle is thus rotated, the cam rollers will engage in a notch 63 in each lever arm 37 and 38 adjacent the cam surfaces to hold the hammer in a retracted position. The lock is then inserted through slots 59 and 61 to engage groove 22 of the male member. The handle 33 is then rotated in the opposite direction to disengage the cam rollers from the notches 63. The hammer is now restrained against the spring bias by the lock 53.

A lanyard 60, tethers the lock to ground. Upon launching the missile, the lock is pulled free releasing the biased hammer head 25 to forcibly strike the male member 20 to disengage it from its mated position. Thus, the electrical contact is broken. The male member remains with the launched missile. The hammer can travel only a short distance due to the stop effected when the cam rollers 51 and 52 come in contact with adjacent end surface of the housing 3.

A new connection can be made easily and simply by mating a new male member to the original female member 19. The umbilical connector is then cocked and locked as has been described.

Thus it is apparent that reloading can be done with ease and does not require the aid of special tools or special servicing. Member 20 is a low priced component and therefore its loss is of minimal cost consideration.

Thus it will be appreciated that this invention provides a means of effecting a low cost, safe and easily operated umbilical connector of novel construction.

It is to be assumed that various modifications of the connector design described herein can be made without changing the spirit and scope of the embodiment as claimed.

The invention claimed is:
1. An electrical connector assembly comprising:
 (a) an elongated housing having a base with a central opening therethrough and a wall upstanding about the outer periphery of said base;
 (b) a conduit section disposed within said housing and carried by said base in registry with said opening and concentric with said wall;
 (c) a hammer disposed in said housing, said hammer having a portion thereof arranged for slidable movement through the end of the housing remote from the base;
 (d) a spring disposed in operative engagement between said base and said hammer for normally biasing said hammer in a direction away from the base;
 (e) a cocking means carried by the housing and operatively connected to the hammer for moving said hammer toward said housing base against the bias of the spring;
 (f) a first electrical connector element carried by the conduit section remote from said base, said element being secured at one end to said conduit section and provided at the opposite end thereof with a plurality of electrical terminal sockets;
 (g) a lock releasably carried by said housing adjacent the end remote from the base, said lock providing means to restrain the hammer against the bias of the spring; and
 (h) a second electrical connector element adapted to be slidably received and retained within the end of said housing remote from the base, said second element having a plurality of electrical terminals adapted to be matingly received within said sockets, said second element being adapted to be contacted by said hammer whereby on release of said lock, the hammer, under the influence of said spring bias, will forceably move said second element so as to cause said second element to separate from said first connector element.
2. An electrical connector assembly as set forth in claim 1 wherein said base is formed with guide slots extending therethrough, and said hammer is provided with depending tongues extending slidably through said slots and operably connected wtih said cocking means remote from said base.
3. An electrical connector assembly as set forth in claim 1 wherein said wall is formed with diametrically opposed slots therethrough adjacent the end remote from the base, said lock being fork-shaped with the tines thereof slidably received in said last-named slots and in positive engagement with said second element for retaining the same in contact with the hammer, said engagement simultaneously acting to restrain the hammer against movement due to the bias of the spring.
4. An electrical connector assembly as set forth in claim 2 wherein said cocking means includes: a pair of lever arms each having one end thereof pivoted on the housing, a cam surface integrally formed on each said arm adjacent the pivoted end; and a cam follower operatively affixed to each of said tongues remote from the said portion of said hammer, each of said followers being engageable with a respective cam surface.
5. An umbilical connector comprising:
 (a) a housing having a cylindrical wall, an open end, and a base, said base having a central opening therethrough and having spaced guide slots therethrough adjacent said opening, and the cylindrical wall having a pair of diametrically opposed slots extending therethrough adjacent the open end of the housing;
 (b) a conduit section disposed within the housing and rigidly affixed to the base and extending through said opening to project outwardly from the base;
 (c) a hammer disposed in said housing and about said conduit section, said hammer having a head and depending tongues normal to the head, said tongues extending slidably through the guide slots;
 (d) a spring disposed in said housing to bias the head in a direction away from the base of the housing;
 (e) a cocking mechanism operatively affixed to said housing, said mechanism having a pair of lever arms each pivotally connected at one end thereof to the housing, a cam integrally formed with each of said arms adjacent said one end, a handle carried by and extending between said arms remote from said one end;
 (f) a cam roller fastened to each of the tongues normal thereto remote from the head, said cam rollers each riding upon respective ones of said cams;
 (g) a male-female electrical connector, the female member thereof being fixedly fastened to said conduit section and the male member being releasably engaged with said female member; and
 (h) a fork-shaped lock having the tines thereof in sliding engagement through said diametrically opposed slots and engaging surfaces of the male member to restrain the same against the effects of the spring biased hammer, whereby disengagement of the male member is accomplished by withdrawal of said lock from the slots allowing the spring biased hammer to forcibly move said male member and eject the male member from the umbilical connector assembly through said open end thereof.

References Cited by the Examiner
UNITED STATES PATENTS

| 2,431,213 | 11/47 | Velez | 339—45 |
| 2,688,734 | 9/54 | Welling | 339—45 |
| 2,853,690 | 9/58 | Madison | 339—45 |

FOREIGN PATENTS

| 580,821 | 9/46 | Great Britain. |
| 495,935 | 8/54 | Italy. |

JOSEPH D. SEERS, *Primary Examiner.*